United States Patent [19]
Yasuda

[11] Patent Number: 5,993,998
[45] Date of Patent: Nov. 30, 1999

[54] POSITIVE ACTIVE MATERIAL FOR LITHIUM BATTERY, LITHIUM BATTERY HAVING THE SAME AND METHOD FOR PRODUCING THE SAME

[75] Inventor: Hideo Yasuda, Kyoto, Japan

[73] Assignee: Japan Storage Battery Co., Ltd., Kyoto, Japan

[21] Appl. No.: 08/994,326

[22] Filed: Dec. 19, 1997

[30] Foreign Application Priority Data

Dec. 20, 1996 [JP] Japan .................................. 8-355280
Nov. 21, 1997 [JP] Japan .................................. 9-337961

[51] Int. Cl.$^6$ ................................................ H01M 4/52
[52] U.S. Cl. ............... 429/231.95; 429/223; 429/231.3; 423/594; 423/599; 423/600
[58] Field of Search ......................... 429/223, 231.1, 429/231.3, 231.9, 231.95, 218.1; 423/594, 599, 600, 277, 306, 326

[56] References Cited

U.S. PATENT DOCUMENTS 5,783,333   7/1998   Mayer ...................................... 429/223

FOREIGN PATENT DOCUMENTS 0 571 858 A1   12/1993   European Pat. Off. .
0 720 247 A1   7/1996    European Pat. Off. .
0 820 111 A2   1/1998    European Pat. Off. .

OTHER PUBLICATIONS

Database WPI Section Ch, Week 9821 Derwent Publications Ltd., London, GB; AN 98–236374 XP002091501 for JP 10 074515 A (Yamaha Corp), Mar. 17, 1998.

*Primary Examiner*—Maria Nuzzolillo
*Assistant Examiner*—Angela J. Martin
*Attorney, Agent, or Firm*—Sughrue, Mion, Zinn, Macpeak & Seas, PLLC

[57] ABSTRACT

A positive active material for lithium battery, includes a lithium-containing amorphous nickel oxide represented by a chemical composition formula of $Li_xNiO_2$; wherein x is from greater than 0.25 to 2. Preferably, x is from greater than 1 to 2. More preferably, x is from greater than 1.4 to 2. The positive active material may contains cobalt from 2 to 60 mol % $\{(Co/(Ni+Co)\}$.

20 Claims, 2 Drawing Sheets

POSITIVE ACTIVE MATERIAL FOR LITHIUM BATTERY, LITHIUM BATTERY HAVING THE SAME AND METHOD FOR PRODUCING THE SAME

BACKGROUND OF THE INVENTION

1. Field of the Invention

The present invention relates to a positive active material for lithium battery, a lithium battery having such a positive active material, and a method for producing such a positive active material for a lithium battery.

2. Description of the Related Art

In recent years, a lithium ion battery comprising as a negative electrode a carbon-based material and as a positive electrode lithium cobaltate which is a composite oxide having a layered structure has rapidly spread because of its advantage, i.e., high operating voltage and high energy density. On the other hand, lithium cobaltate occurs scarcely and is expensive. Thus, lithium nickelate has been extensively studied as a substitute material.

Lithium nickelate ($LiNiO_2$) is a layered structure compound having the same crystal structure as lithium cobaltate, which has already been put into practical use. In the crystal structure of lithium nickelate, lithium is arranged to be occluded between layers in edge shear of $NiO_6$ octahedral. The production of lithium nickelate is normally carried out by a method which comprises mixing $Ni(NO_3)_2$, $Ni(OH)_2$, $NiCO_3$, $NiO$, $NiOOH$ or the like as a nickel source and $LiOH$, $LiNO_3$, $Li_2CO_3$, $Li_2O_2$ or the like as a lithium source, and then subjecting the mixture to heat treatment at a temperature of about 600° C. to 900° C. in a stream of oxygen.

However, as reported in "Solid State Ionics", 44, 87, 1990, "Chem. Express", 7, 689, 1992 and 33rd Battery Symposium in Japan, page 21, 1992, lithium nickelate is disadvantageous in that its structure is similar to rock salt structure and thus is liable in the production method to substitution of nickel with lithium ions, thereby giving asymmetric structure that causes capacity decrease.

In this respect, the use of nickel oxyhydroxide as a nickel material has boon attempted. For example, a method has been proposed, which comprises allowing lithium nitrate to act on nickel oxyhydroxide containing cobalt to synthesize lithium nickelate which undergoes uniform charge-discharge reaction as disclosed in Unexamined Japanese Patent Publication No. (kokai) Hei. 8-306360. Further, a method for the application of electrochemically produced lithium nickelate to lithium battery has been proposed, which comprises charging nickel hydroxide electrochemically in a lithium hydroxide solution as disclosed in Unexamined Japanese Patent Publication (kokai) No. Sho. 63-19761.

Moreover, an active material for lithium battery has been proposed, which is made of nickel oxyhydroxide containing cobalt in an amount of from 20% to 75% as disclosed in Unexamined Japanese Patent Publication (kokai) No. Sho. 63-19760.

As mentioned above, various studies have been made of lithium nickelate. Nevertheless, it is still difficult to obtain a sufficient capacity with lithium nickelate. A further difficulty is that lithium nickelate exhibits charge-discharge characteristics that are liable to change by steps, e.g., four stages and shows poor high rate discharge performance.

SUMMARY OF THE INVENTION

It is an object of the present invention to provide a positive active material which allows a battery with the positive active material having a large discharge capacity, to exhibit a continuous discharge voltage change and a high energy density, a battery having the positive active material and a method for producing the positive active material.

The present invention has been accomplished by finding out the fact that lithium nickelate having an amorphous structure has unprecedentedly excellent properties during the inventors, studies of lithium nickolate.

First aspect of the present invention concerns a positive active material for lithium battery, which comprises a lithium-containing amorphous nickel oxide represented by a chemical composition formula of $Li_xNi_{1-y}M_yO_2$; wherein x is from greater than 0.25 to 2, y is from 0 to less than 1, and M is at least one selected from the group consisting of Co, Mn, Al, P, B and Si.

Second aspect of the present invention concerns the positive active material for lithium battery according to the first aspect of the present invention, wherein x is from greater than 1 to 2.

Third aspect of the present invention concerns a positive active material for lithium battery, which comprises a lithium-containing amorphous nickel oxide synthesized to have a chemical composition formula of $Li_xNi_{1-y}M_yO_2$; wherein x is from greater than 1.4 to 2, y is from 0 to less than 1, and M is at least one selected from the group consisting of Co, Mn, Al, Pr B and Si.

Fourth aspect of the present invention concerns to the positive active material for lithium battery according to the first aspect of the present invention, wherein said positive active material satisfies said chemical composition formula at discharge state.

Fifth aspect of the present invention concerns to the positive active material for lithium battery according to the second aspect of the present invention, which contains cobalt from 2 to 60 mol % $\{(Co/(Ni+Co)\}$.

Sixth aspect of the present invention concerns to a positive active material for lithium battery, which comprises a lithium-containing amorphous nickel oxide represented by a chemical composition formula of $Li_xNi_{1-y-z}Co_yM_zO_2$; wherein x is from greater than 0.25 to 2, y is from 0.02 to 0.6, z is from 0 to less than 1, y+z is less than 1 and M at least one selected from the group consisting of Co, Mn, Al, P, B and Si.

Seventh aspect of the present invention concerns a positive active material for lithium battery, which comprises a lithium-containing amorphous nickel oxide synthesized to have a chemical composition formula of $Li_xNi_{1-y-z}Co_yM_zO_2$; wherein x is from greater than 1.4 to 2, y is from 0.02 to 0.6, z is from 0 to less than 1, y+z is less than 1 and M is at least one selected from the group consisting of Co, Mn, Al, P, B and Si.

Eighth aspect of the present invention concerns to the positive active material for lithium battery according to the sixth aspect of the present invention, wherein x is greater than 1.4 to 2.

Ninth aspect of the present invention concerns a positive active material for lithium battery according to any one of the preceding aspects of the present invention, comprising phosphorus, boron or silicon incorporated therein.

Tenth aspect of the present invention concerns a lithium battery, comprising a positive active material for lithium battery according to any one of the preceding aspects of the present invention.

Eleventh aspect of the present invention concerns a method for producing a positive active material for lithium battery according to the ninth aspect of the present invention, which comprises mixing at least one salt selected from the group consisting of phosphate, borate and silicate, a lithium salt and nickel hydroxide or nickel oxyhydroxide, and then subjecting the mixture to heat treatment.

DETAILED DESCRIPTION OF THE INVENTION

Figure 1:
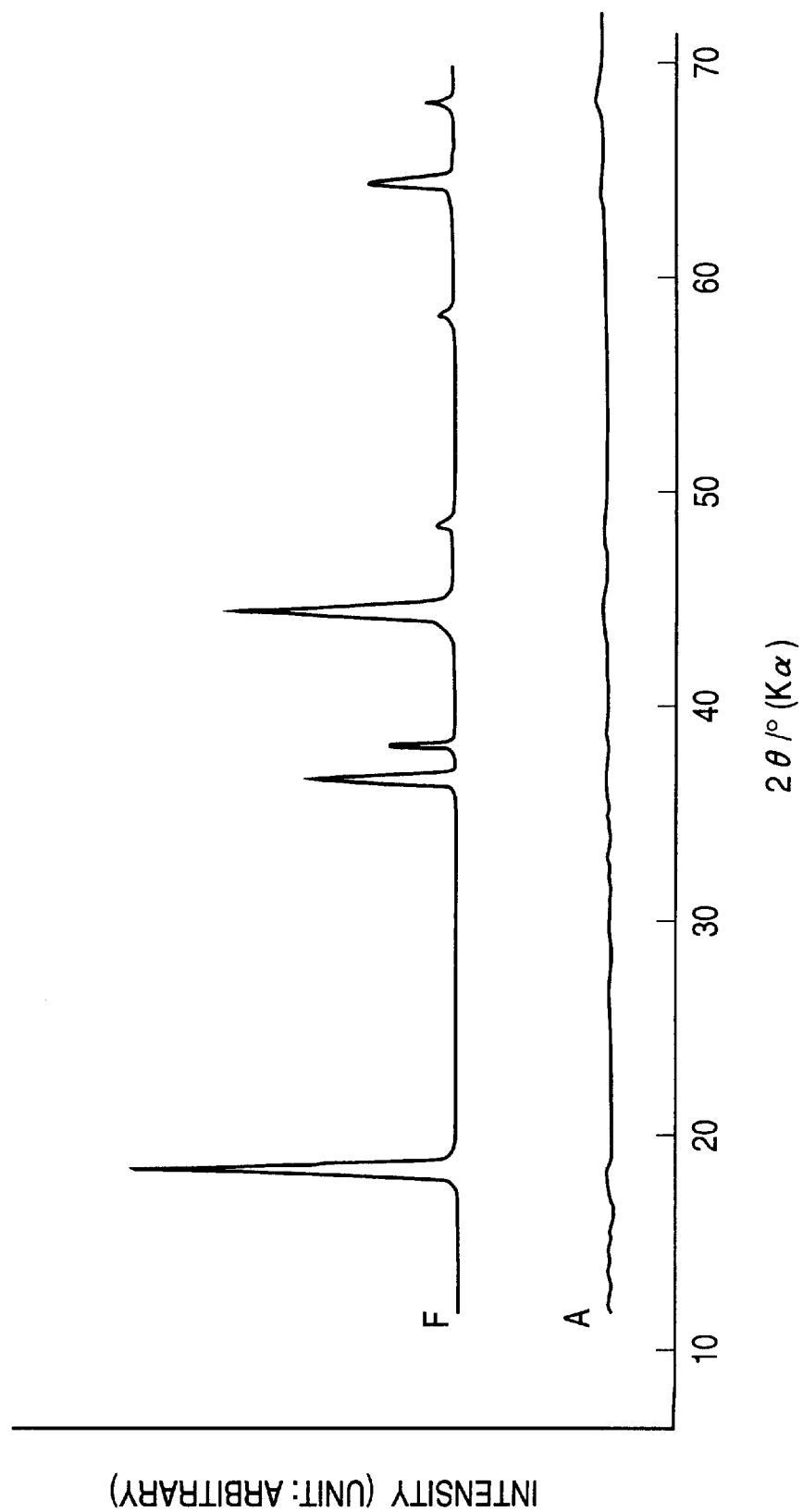
FIG. 1 is a diagram illustrating X-ray diffraction pattern.

Detailed description of the invention will be described as follows referring to the accompanying drawings.

According to the present invention, the positive active material for lithium battery is produced by a method in which nickel hydroxide is mixed with a predetermined amount of a lithium salt and a phosphate, borate or silicate, and then the mixture is heat-treated or a method in which nickel oxyhydroxide is mixed with a predetermined amount of a lithium salt and a phosphate, borate or silicate, and the mixture is heat-treated. In this production method, the lithium salt and phosphate, borate or silicate may be used in the form of a solution containing lithium ion and phosphate ion, borate ion or silicate ion. The nickel oxyhydroxide may be in β-type structure, γ-type structure or mixture thereof. The nickel hydroxide may be in β-type structure or α-type structure.

In order to produce $Li_xNi_{1-y}Co_yO_2$ containing cobalt therein, nickel hydroxide containing cobalt is preferably used in the foregoing production method.

In accordance with the foregoing synthesis method, an amorphous oxide represented by the chemical composition formula of $Li_xNiO_2$ or $Li_xNi_{1-y}Co_yO_2$ is to be obtained. The synthesis is preferably carried out so that x is from greater than 1 to 2, preferably from greater than 1.4 to 2, and y is from 0.02 to 0.6. In addition, $Li_xNi_{1-y}Co_yO_2$ has an effect to further improve the charge-discharge endurance performance as a positive active material. In this case, it is preferably to be synthesized so that y representing the ratio of the elements in the chemical composition formula is from 0.02 to 0.6. Thus, the incorporation of cobalt makes it possible to further enhance the charge-discharge endurance of the positive active material.

In accordance with the foregoing production method with a phosphate, borate or silicate, the foregoing amorphous oxide containing phosphorus, boron or silicon depending on the salt used is to be obtained. In the foregoing production method, the phosphate, borate or silicate is added to help render the product amorphous. Apart from the resulting effect, amorphous $Li_xNiO_2$ or $Li_xNi_{1-y}Co_yO_2$ comprising phosphorus, boron or silicon incorporated therein is a positive active material excellent in properties. The positive active material of the present invention may contain other elements such as manganese or aluminum therein as necessary.

Further, the lithium-containing amorphous nickel oxide may include at least one another element, e.g., Co, Mn, Al, if necessary. Preferably, this included element is incorporated in the oxide as an element which constitutes the oxide so that the lithium-containing amorphous nickel oxide is represented by the chemical composition formula of $Li_xNi_{1-y-z}M_yO_2$ wherein x is from greater than 0.25 to 2, M is at least one of Co, Mn, Al, P, B and Si, and y is from 0 to less than 1. In this case, except the case where M is selected from Co, y is preferably from 0 to less than 0.5. On the other hand, in the case where M is selected from Co, the lithium-containing amorphous nickel cobalt oxide is preferably represented by the chemical composition formula of $Li_xNi_{1-y-z}Co_yM_zO_2$ wherein x is from greater than 1.4 to z is from 0.02 to 0.6, M is at least one of Mn, Al, P, B and Si, z is from 0 to less than 1 and y+z is less than 1. In this case, z is preferably from 0 to 0.5.

In order to produce a positive electrode for secondary lithium battery from the foregoing active material, an example of production method may be applying a paste containing a powdered lithium-containing amorphous nickel oxide, an electrically conducting agent such as graphite and carbon black and a binder such as polyethylene and polyvinylidene fluoride to a metallic collector made of nickel, aluminum or the like, and then drying the coated material. The positive material may include other active materials incorporated therein besides the active material of the present invention to adjust its positive electrode properties such as existing lithium nickelate or lithium cobaltate.

In order to produce a battery, e.g., nonaqueous electrolyte secondary lithium battery, the foregoing positive electrode, an electrolyte obtained by dissolving a lithium salt such as lithium perchlorate and lithium phosphate hexafluoride in a nonaqueous solvent made of a mixture of ethylene carbonate and diethyl carbonate, and a negative electrode containing lithium metalt lithium alloy or carbon-based material as a negative active material and a material capable of intercalating/disintercalating lithium ion such as graphite or metal oxides are assembled in combination.

For example, a secondary lithium battery containing amorphous $Li_xNiO_2$ or $Li_xNi_yCo_{1-y}O_2$ of the present invention as a positive active material produced according to the foregoing production method exhibits uniform charge-discharge properties 20 and a capacity as high or greater than the substantially theoretical value which is considered possible with $Li_xNiO_2$, i.e., 200 mAh/g.

The foregoing results can be considered attributed to the following possible reaction of the active material of the present invention.

The reaction of the conventional crystalline lithium nickelate involves a one-electron reaction represented by the following formulae (1) and (2). The gravimetric theoretical capacity based on the reaction is 275 mAh/g. This is an electrochemical reaction in which the valency of nickel changes between trivalence and tetravalene. In this case, the chemical composition formula $Li_xNiO_2$ of the positive active material in the battery is controlled so that x is from 0 to 1.

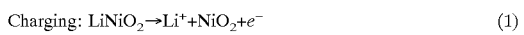

Charging: $LiNiO_2 \rightarrow Li^+ + NiO_2 + e^-$ (1)

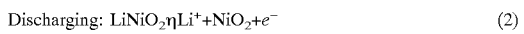

Discharging: $LiNiO_2 \eta Li^+ + NiO_2 + e^-$ (2)

On the other hand, the amorphous $Li_xNiO_2$ of the present invention undergoes a 1.75-electron reaction represented by the following formulae (3) and (4). The chemical composition formula $Li_xNiO_2$ of the positive active material in the battery is controlled so that x changes reversibly within a range of from greater than 0.25 to 2. In this case, the gravimetric theoretical capacity is 448 mAh/g. The potential changes a continuously.

Charging: $Li_2NiO_2 \rightarrow 1.75Li^+ + Li_{0.25}NiO_2 + 1.75e^-$ (3)

Discharging: $Li_2NiO_2 \eta 1.75Li^+ + Li_{0.25}NiO_2 + 1.75e^-$ (4)

Charging can be effected until x reaches 0.25 or less. However, in order to improve the repeatability of the battery, it is preferred that charging be effected no longer. Therefore, the chemical composition formula $Li_xNiO_2$ of the positive active material is preferably controlled so that x is from greater than 0.25 to 2. Further, in order to make the effective use of the advantages of the present invention, the chemical composition formula $Li_xNiO_2$ of the positive active material during discharging is preferably controlled so that x is from greater than 1.4 to 2. Similarly, the chemical composition formula $Li_xNi_{1-y}Co_yO_2$ is preferably controlled so that x is from greater than 0.25 to 2. The chemical composition formula $Li_xNi_{1-y}Co_yO_2$ of the positive active material at discharge state is preferably controlled so that x is from greater than 1.4 to 2 and y is from 0.02 to 0.6.

EXAMPLES

The present invention will be further described in the following examples.

Example 1

3 mol of a powdered nickel hydroxide {$Ni_{0.98}Co_{0.02}(OH)_2$} containing cobalt having a size from 5 to 50 μm in an amount of 2 mol % {(Co/(Ni+Co)}, 6 mol of lithium hydroxide and 0.1 mol of phosphoric acid ($H_3PO_4$) were heat-treated at 700° C. in an oxygen atmosphere for 7 hours to obtain a lithium-containing amorphous nickel oxide A as a positive active material according to the present invention. The product was found to be mainly composed of $Li_{1.8}Ni_{0.98}Co_{0.02}O_2$ as analyzed chemically.

Example 2

2 mol of a powdered nickel β-oxyhydroxide (β-$Ni_{0.95}Co_{0.05}$OOH) containing cobalt having a size from 5 to 50 μm in an amount of 5 mol % {(Co/(Ni+Co)}, 3 mol of lithium hydroxide and 0.2 mol of lithium hypophosphite ($LiH_2PO_2$) were mixed. The mixture was then heat-treated at 450° C. in an atmosphere of argon containing 20% of oxygen for 10 hours to obtain a lithium-containing amorphous nickel oxide B as a positive active material according to the present invention. The product was found to be mainly composed of $Li_{1.4}Ni_{0.95}Co_{0.05}O_2$ as analyzed chemically.

Example 3

Boric acid ($H_3BO_3$) in an amount of 30 g/l was added to an aqueous solution of a mixture of cobalt nitrate having a cobalt content of 10 mol % {(Co/(Ni+Co)} and nickel nitrate (pH=1.0, specific gravity: 1.65 (20° C.)). Then, a 4.5M aqueous solution of sodium hydroxide was added to the mixture. The resulting precipitate was washed with hot water, dried at 120° C., and then ground by a ball mill to synthesize a boron-containing amorphous nickel hydroxide powder having a size of from 50 to 100 μm. 3 mol of this powder and 6 mol of lithium nitrate ($LiNO_3$) were mixed, ground, and then heat-treated at a temperature of 400° C. in an atmosphere of argon containing 20% of oxygen for 10 hours to obtain a lithium-containing amorphous nickel oxide C according to the present invention. The product was found to be mainly composed of $Li_{1.8}Ni_{0.9}Co_{0.10}O_2$ as analyzed chemically.

Example 4

4.5M aqueous solution of sodium hydroxide containing silicic acid ($H_4SiO_4$) in an amount of 35 g/l was added to an aqueous solution of a mixture of cobalt nitrate having a cobalt content of 5 mol % {(Co/(Ni+Co)} and nickel nitrate (pH=1.0, specific gravity: 1.65 (20° C.)). The resulting precipitate was washed with hot water, dried at a temperature of 120° C., and then ground by a ball mill to synthesize a nickel hydroxide powder having a size of from 50 to 100 μm. 3 mol of this powder and 7 mol of lithium hydroxide (LiOH) were mixed, ground, and then heat-treated at 700° C. in an atmosphere of argon containing 20% of oxygen for 10 hours to obtain a lithium-containing amorphous nickel oxide D according to the present invention. The product was found to be mainly composed of $Li_{2.2}Ni_{0.95}Co_{0.05}O_2$ as analyzed chemically. As analyzed chemically, the resulting lithium-containing amorphous nickel oxide had a composition formula of $Li_xNiO_2$ wherein x exceeds 2, i.e., 2.2. This is presumed attributed to the presence of a lithium salt as an impurity.

Example 5

Phosphoric acid ($H_3PO_4$) in an amount of 35 g/l is added to an aqueous solution of a mixture of cobalt nitrate having a cobalt content of 8 mol % {(Co/(Ni+Co)} and nickel nitrate (pH=1.0, specific gravity: 1.65 (20° C.)). Then a 4.5M aqueous solution of sodium hydroxide was added to the mixture. The resulting precipitate was washed with hot water, dried at a temperature of 120° C., and then ground by a ball mill to synthesize a nickel hydroxide powder having a size of from 50 to 100 μm. 3 mol of this powder and 6 mol of potassium peroxodisulfate were mixed in a 2M aqueous solution of sodium hydroxide, washed with hot water, and then dried 110° C. to synthesize β-$Ni_{0.92}Co_{0.08}$OOH. 3 mol of this β-$Ni_{0.92}Co_{0.08}$OOH powder and 6 mol of LiOH were mixed, and then heat-treated at 350° C. to obtain a lithium-containing amorphous nickel oxide E according to the present invention. The product was found to be mainly composed of $Li_{1.9}Ni_{0.92}Co_{0.08}O_2$ as analyzed chemically.

These lithium nickelate products were each then subjected to X-ray diffractometry. As a result, all the products were found to show no sharp diffraction peaks as shown in X-ray diffraction pattern of the conventional lithium nickelate ($LiNiO_2$) and diffused peaks. This is attributed to the amorphous structure of the products. As a result of emission spectroscopic analysis, the lithium-containing amorphous nickel oxides A, B, and E were found to contain phosphorus, and the lithium-containing amorphous nickel oxides C and D were found to contain boron and silicon, respectively. Thus, these additives are considered to be effective for the formation of an amorphous structure.

The X-ray diffraction pattern of the conventional lithium nickelate ($LiNiO_2$) and the lithium-containing amorphous nickel oxide A of Example 1 are shown in FIG. 1. Unlike the conventional active material F, the active material A according to the present invention shows little or no peaks. The lithium-containing amorphous nickel oxides B, C, D and E showed almost the same X-ray diffraction pattern as the product A.

Subsequently, a mixture of 100 parts of each of these products and 8 parts of acetylene black was kneaded in 60 ml of a 1% polyvinylidene fluoride solution of n-methyl-2-pyrrolidole to produce a paste. This paste was filled in a foamed aluminum having a porosity of 90%, and then dried at 120° C. to produce a positive plate having a size of 30 mm×40 mm×0.8 mm and a nominal capacity of 300 mAh. A sheet of the foregoing positive electrode plate, two sheets of metallic lithium electrodes having the same size as the positive electrode, and 300 ml of a mixture of ethylene carbonate and diethyl carbonate containing 1M of lithium perchlorate as an electrolyte were then assembled into test batteries (A, B, C, D and E; these symbols correspond to that of the positive active materials). For comparison, a battery F consisting of the conventional lithium nickelate ($LiNiO_2$) as an active material was also produced.

The positive electrode was charged at 15 mA to 4.2 V (with respect to the metallic lithium). The capacity per weight of active material determined during discharging at 30 mA to 2.0 V is set forth in Table 1.

TABLE 1

| Battery | Discharge capacity (mAh/g) |
|---------|---------------------------|
| A       | 320                       |
| B       | 316                       |
| C       | 300                       |
| D       | 300                       |
| E       | 265                       |
| F       | 150                       |

As can be seen in table 1, the batteries having the positive active material according to the present invention exhibit a capacity of from 260 to 320 mAh/g, a drastic increase from that of the battery having the conventional positive electrode, i.e., 150 mAh/g.

Figure 2:
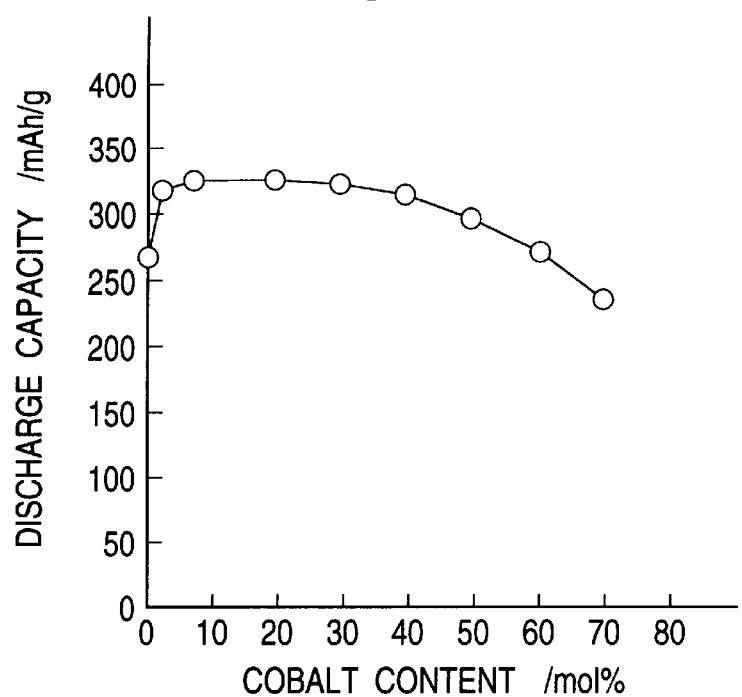
FIG. 2 is a diagram illustrating the relationship between discharge capacity and cobalt content.

Further, active materials were then produced in the same manner as in Example 1 except that the cobalt content was changed. These active materials were produced in the same manner as the test battery A to produce batteries which were then subjected to charge-discharge test in the same manner as in Table 1. The relationship between the discharge capacity and the cobalt content is shown in FIG. 1. As can be seen in FIG. 2, when the cobalt content is from 2 to 60 mol % {(Co/(Ni+Co)}, the discharge capacity is greater than that of battery having no cobalt content. Thus, this range of cobalt content is preferable.

Figure 3:
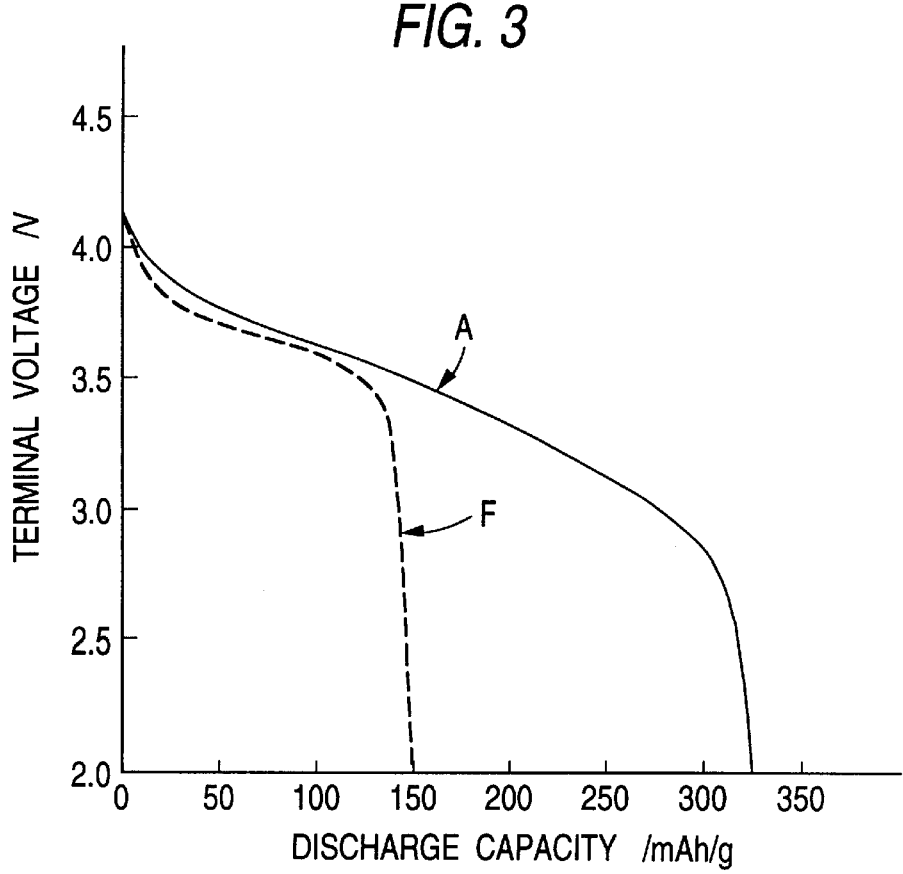
FIG. 3 is a diagram illustrating the comparison in discharge characteristics between the battery A according to the present invention and the conventional battery F.

Further, the batteries A, B, C, D and E according to the present invention exhibit a continuous discharge characteristic curve as compared with the conventional battery F, demonstrating that the diffusion of lithium ion homogeneously occurred. As a representative example, the discharge characteristics of the battery A of the present invention showing the highest discharge capacity and the conventional battery F are shown in FIG. 3. The battery A having the positive active material according to the present invention exhibitS a higher discharge capacity than the battery having the conventional active material and shows a continuous discharge characteristic curve. When the conventional battery discharges, the discharge capacity shows a sudden drop as its terminal voltage falls below 3.5 V. On the contrary, the batteries according to the present invention can discharge while the discharge capacity falling gradually even when its terminal voltage falls below 3.5 V.

In general, the lithium-containing amorphous nickel oxide according to the present invention can discharge even when the terminal voltage falls below 3.5 V. It was found that this characteristic appears when the positive active material is amorphous. This characteristic appears particularly when the cobalt content falls within the range of from 2 to 60 mol % {(Co/(Ni+Co)}. It was thus also found that the incorporation of cobalt provides enhancement of charge-discharge cycle endurance as compared with the absence of cobalt.

More importantly, the positive active material of the present invention can provide a capacity exceeding the theoretical value which has heretofore been considered possible, i.e., 275 mAh/g. In general, a lithium nickelate positive active material undergoes an electrode reaction represented by the formulae (1) and (2) as previously mentioned. However, when the oxidation state of nickel in the lithium nickelate exceeds a valency of 3.75, the crystal structure of the positive active material becomes unstable. Therefore, the highest charge voltage of the positive active material is defined to the vicinity of 4.2 V. In this case, the theoretical capacity which can be put into practical use is 206 mAh/g as determined by a 0.75-electron reaction consisting of a charging reaction represented by the following formula (5) and a discharge reaction represented by the following formula (6).

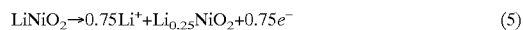

$$LiNiO_2 \rightarrow 0.75Li^+ + Li_{0.25}NiO_2 + 0.75e^- \quad (5)$$

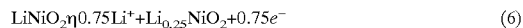

$$LiNiO_2 \eta 0.75Li^+ + Li_{0.25}NiO_2 + 0.75e^- \quad (6)$$

However, the batteries having the positive active material according to the present invention can provide a discharge capacity exceeding the theoretical value even if the charging conditions are predetermined so that the oxidation state of nickel is a valency of 3.75. In addition to this fact, the foregoing fact that discharging can be effected even if the discharge voltage is not higher than 3.5 V demonstrates that discharge can be effected even in a region where the discharge depth is lower than the nickel valency of 3.

As previously mentioned, lithium nickelate can discharge even if lithium has a valency of 3 or less. It has been reported that this discharging causes a change in the crystal structure that makes the discharge potential discontinuous. On the contrary, the positive active material shows a continuous change of discharge potential. It is thus presumed that lithium ion can easily diffuse from the surface into the interior of the crystal structure in the amorphous positive active material according to the present invention. It is further presumed that the positive active material according to the present invention can discharge until the valency of nickel falls below 3 while maintaining its crystal structure.

In this case, the theoretical capacity is 448 mAh/g as determined by a 1.75-electron reaction represented by the following formula (3) which begins with $Li_2NiO_2$ as discharged state and ends with $Li_{0.25}NiO_2$ as charged state. Supposing that the charged state is $NiO_2$, the theoretical capacity is also expected to be as high as 512 mAh/g. The formula (3) indicates a charging reaction while the formula (4) indicates a discharging reaction.

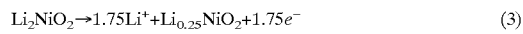

$$Li_2NiO_2 \rightarrow 1.75Li^+ + Li_{0.25}NiO_2 + 1.75e^- \quad (3)$$

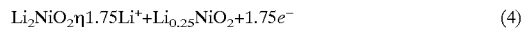

$$Li_2NiO_2 \eta 1.75Li^+ + Li_{0.25}NiO_2 + 1.75e^- \quad (4)$$

Therefore, the composition formula of the active material according to the present invention can be defined as $Li_xNiO_2$ wherein x is from greater than 1 to 2. It goes without saying that when lithium is incorporated in the active material as an impurity, x exceeds 2, e.g., 2.2, as shown in Example 4.

The foregoing examples have been described with reference to lithium battery having metallic lithium as a negative electrode. However, it goes without saying that similar effects can be exerted when a carbon-based material is used as a negative electrode.

The positive active material for a lithium battery of the lithium-containing amorphous nickel oxide or the lithium-containing amorphous nickel cobalt oxide according to the present invention or the positive active material for lithium battery can provide a battery having a raised discharge capacity. Further, the resulting battery shows a continuous discharge voltage change and exhibits a high energy density. In accordance with the production method of the present invention, the lithium-containing amorphous nickel oxide of the present invention can be easily produced.

What is claimed is:

1. A positive active material for lithium battery, comprising a lithium-containing amorphous nickel oxide represented by a chemical composition formula of $Li_xNi_{1-y}M_yO_2$;

wherein x is from greater than 0.25 to 2, y is from 0 to less than 1, and M is at least one selected from the group consisting of Co, Mn, Al, P, B and Si.

2. A positive active material for lithium battery according to claim 1, wherein x is from greater than 1 to 2.

3. A positive active material for lithium battery, comprising a lithium-containing amorphous nickel oxide synthesized to have a chemical composition formula of $Li_xNi_{1-y}M_yO_2$;

wherein x is from greater than 1.4 to 2, y is from 0 to less than 1, and M is at least one selected from the group consisting of Co, Mn, Al, P, B and Si.

4. A positive active material for lithium battery according to claim 1, wherein said positive active material satisfies said chemical composition formula at discharge state.

5. A positive active material for lithium battery according to claim 2, containing cobalt from 2 to 60 mol % {(Co/(Ni+Co)}.

6. A positive active material for lithium battery, comprising a lithium-containing amorphous nickel oxide represented by a chemical composition formula of $Li_xNi_{1-y-z}Co_yM_zO_2$;

wherein x is from greater than 0.25 to 2, y is from 0.02 to 0.6, z is from 0 to less than 1, y+z is less than 1 and M is at least one selected from the group consisting of Co, Mn, Al, P, B and Si.

7. A positive active material for lithium battery, comprising a lithium-containing amorphous nickel oxide synthesized to have a chemical composition formula of $Li_xNi_{1-y-z}Co_yM_zO_2$; wherein x is from greater than 1.4 to 2, y is from 0.02 to 0.6, z is from 0 to less than 1, y+z is less than 1 and M is at least one selected from the group consisting of Co, Mn, Al, P, B and Si.

8. A positive active material for lithium battery according to claim 6, wherein x is greater than 1.4 to 2.

9. A positive active material for lithium battery according to any one of claims 1 to 8, which contains at least one selected from the group consisting of phosphorus, boron and silicon.

10. A lithium battery comprising a positive active material comprising a lithium-containing amorphous nickel oxide represented by a chemical composition formula of $Li_xNi_{1-y}M_yO_2$; wherein x is from greater than 0.25 to 2, y is from 0 to less than 1, and M is at least one selected from the group consisting of Co, Mn, Al, P, B and Si.

11. A lithium battery comprising a positive active material comprising a lithium-containing amorphous nickel oxide synthesized to have a chemical composition formula of $Li_xNi_{1-y}M_yO_2$; wherein x is from greater than 1.4 to 2, y is from 0 to less than 1, and M is at least one selected from the group consisting of Co, Mn, Al, P, B and Si.

12. A lithium battery according to claim 10, wherein said positive active material satisf ies said chemical composition formula at discharge state.

13. A lithium battery comprising a positive active material, comprising a lithium-containing amorphous nickel oxide represented by a chemical composition formula of $Li_xNi_{1-y-z}Co_yM_zO_2$; wherein x is from greater than 0.25 to 2, y is from 0.02 to 0.6, z is from 0 to less than 1, y+z is less than 1 and M is at least one selected from the group consisting of Co, Mn, Al, P, B and Si.

14. A lithium battery comprising a positive active material comprising a lithium-containing amorphous nickel oxide synthesized to have a chemical composition formula of $Li_xNi_{1-y-z}Co_yM_zO_2$; wherein x is from greater than 1.4 to 2, y is from 0.02 to 0.6, z is from 0 to less than 1, y+z is less than 1 and M is at least one selected from the group consisting of Co, Mn, Al, P, B and Si.

15. A lithium battery according to claim 13, wherein x is from greater than 1.4 to 2.

16. A lithium battery according to any one of claims 10 to 15, which contains at least one selected from the group consisting of phosphorus, boron and silicon.

17. A method for producing a positive active material for lithium battery comprising the steps of:

mixing at least one salt selected from the group consisting of phosphate, borate and silicate, a lithium salt and at least one nickel compound selected from the group consisting of nickel hydroxide and nickel oxyhydroxide; and subjecting the mixture to heat treatment to produce a positive active material comprising a lithium-containing amorphous nickel oxide represented by a chemical composition formula of $Li_xNi_{1-y}M_yO_2$ containing at least one of phosphorous, boron and silicon;

wherein x is from greater than 0.25 to 2, y is from 0 to less than 1, and M is at least one selected from the group consisting of Co, Mn, Al, P, B and Si.

18. A method for producing a positive active material for lithium battery comprising the steps of:

mixing at least one salt selected from the group consisting of phosphate, borate and silicate, a lithium salt and at least one nickel compound selected from the group consisting of nickel hydroxide and nickel oxyhydroxide; and subjecting the mixture to heat treatment to produce a positive active material comprising a lithium-containing amorphous nickel oxide synthesized to have a chemical composition formula of $Li_xNi_{1-y}M_yO_2$ containing at least one of phosphorous, boron and silicon;

wherein x is from greater than 1.4 to 2, y is from 0 to less than 1, and M is at least one selected from the group consisting of Co, Mn, Al, P, B and Si.

19. A method for producing a positive active material for lithium battery comprising the steps of:

mixing at least one salt selected from the group consisting of phosphate, borate and silicate, a lithium salt and at least one nickel compound selected from the group consisting of nickel hydroxide and nickel oxyhydroxide; and subjecting the mixture to heat treatment to produce a positive active material comprising a lithium-containing amorphous nickel oxide represented by a chemical composition formula of $Li_xNi_{1-y-z}Co_yM_zO_2$ containing at least one of phosphorous, boron and silicon;

wherein x is from greater than 0.25 to 2, y is from 0.02 to 0.6, z is from 0 to less than 1 y+z is less than 1 and M is at least one selected from the group consisting of Co, Mn, Al, P, B and Si.

20. A method for producing a positive active material for lithium battery comprising the steps of:

mixing at least one salt selected from the group consisting of phosphate, borate and silicate, a lithium salt and at least one nickel compound selected from the group consisting of nickel hydroxide and nickel oxyhydroxide; and subjecting the mixture to heat treatment to produce a positive active material comprising a lithium-containing amorphous nickel oxide synthesized to have a chemical composition formula of $Li_xNi_{1-y-z}Co_yM_zO_2$ containing at least one of phosphorous, boron and silicon;

wherein x is from greater than 1.4 to 2, y is from 0.02 to 0.6, z is from 0 to less than 1, y+z is less than 1 and M is at least one selected from the group consisting of Co, Mn, Al, P, B and Si.

* * * * *